US012402687B1

(12) United States Patent
Nasibyan

(10) Patent No.: US 12,402,687 B1
(45) **Date of Patent: *Sep. 2, 2025**

(54) DYNAMIC ORTHOTIC DEVICE

(71) Applicant: Tigran Nasibyan, Erie, PA (US)

(72) Inventor: Tigran Nasibyan, Erie, PA (US)

( * ) Notice: Subject to any disclaimer, the term of this patent is extended or adjusted under 35 U.S.C. 154(b) by 965 days.

This patent is subject to a terminal disclaimer.

(21) Appl. No.: 17/408,380

(22) Filed: Aug. 21, 2021

Related U.S. Application Data

(63) Continuation-in-part of application No. 16/865,328, filed on May 2, 2020, now Pat. No. 11,452,330.

(51) Int. Cl.
*A43B 7/1455* (2022.01)
*A61H 15/00* (2006.01)

(52) U.S. Cl.
CPC .............. *A43B 7/146* (2013.01); *A43B 7/147* (2013.01); *A61H 15/00* (2013.01); *A61H 2205/12* (2013.01)

(58) Field of Classification Search
CPC ............ A61H 15/00; A61H 2015/0042; A61H 2201/1671; A61H 2201/1676; A61H 2201/1284; A61H 2201/1269; A61H 2201/1261; A61H 2201/1253; A61H 2201/149; A61H 2205/12; A43B 7/146; A43B 3/42
See application file for complete search history.

(56) References Cited

U.S. PATENT DOCUMENTS

| | | | | | |
|---|---|---|---|---|---|
| 5,868,688 | A * | 2/1999 | Avidor | A61H 7/004 601/102 |
| 6,234,987 | B1 * | 5/2001 | Chen | A61H 23/02 36/141 |
| 10,492,980 | B2 * | 12/2019 | Giraud | A61H 15/02 |
| 11,452,330 | B1 * | 9/2022 | Nasibyan | A61H 15/00 |
| 2010/0069800 | A1 * | 3/2010 | Hsu | A61H 15/02 601/115 |
| 2010/0081973 | A1 * | 4/2010 | Tsai | A61H 15/0078 601/134 |
| 2010/0179460 | A1 * | 7/2010 | Tsai | A61H 15/0078 601/134 |
| 2010/0280426 | A1 * | 11/2010 | Tsai | A61H 15/0078 601/134 |
| 2014/0276277 | A1 * | 9/2014 | Chen | A61H 7/004 601/112 |
| 2019/0321259 | A1 * | 10/2019 | Zhou | A61H 7/007 |
| 2020/0352274 | A1 * | 11/2020 | Naiker | A43B 3/35 |

* cited by examiner

*Primary Examiner* — Colin W Stuart
*Assistant Examiner* — Douglas Y Sul
(74) *Attorney, Agent, or Firm* — Richard K Thomson

(57) ABSTRACT

A dynamic orthotic device includes upper and lower members which rotate relative to one another allowing the heel of the wearer's foot to engage a fresh, different portion of the device, gently messaging the contacting portion of the wearer's heel greatly reducing the likelihood of plantar faciitis and other foot related problems caused by constant pressure resulting from continuous standing or walking.

6 Claims, 9 Drawing Sheets

DYNAMIC ORTHOTIC DEVICE

BACKGROUND AND SUMMARY OF THE INVENTION

The present invention is directed to the field of orthotics. More particularly, the present invention is directed to a dynamic orthotic device.

As a rule, orthotic devices are static, that is, there is no significant movement, with some exceptions in cases where the device itself is flexible and, accordingly, the heel/foot sees the same pressure in the same place with each successive step. This means that the exertion of pressure on the same spot can produce a "pressure overload" leading/contributing to plantar faciitis and other related foot problems which, typically, orthotics nominally, attempt to remedy.

It is among the objects of this invention to provide the first truly dynamic orthotic device in which the pressure administration point ("pressure point") changes with each step thereby eliminating the pressure buildup that can take place with walking or other forms of exercise. Indeed, with the current dynamic orthotic device, a slight heel-toe rocking motion while standing can produce the desired change in the pressure point providing a "foot massage" as the heel-toe rocking motion activates the dynamic orthotic device.

The present invention is comprised of a dynamic orthotic device for massaging a heel portion of the sole of a wearer's foot, the dynamic orthotic device which includes a) a base member; b) means to house a plurality of spherical balls beneath the heel portion of the sole of the wearer's foot; c) a first means to rotate said means to house in a first rotational direction. The means to house a plurality of spherical balls can include a first rotating disk having a first plurality of spherical ball-receiving holes and a second rotating disk having a second plurality of spherical ball-receiving holes. A second means to rotate the means to house can be included wherein the first means to rotate rotates the first rotating disk in a first rotational direction and the second means to rotate rotates the second rotating disk in a second opposite rotational direction. Each of the first and second means to rotate may each include a gear-toothed member associated with its respective rotating disk and a plurality of spring-biased arms which engage the gear-toothed member. In addition, the device can include a spring-biased pushbutton engaged by a heel of the wearer, the spring-biased pushbutton mounting the pluralities of the spring-biased arms.

In a second embodiment, the dynamic orthotic device for massaging a heel portion of the sole of a wearer's foot includes: a) a first upper member; b) a second lower member supporting the first upper member; c) spring means to bias the first member away from the second member; d) rotation means for turning the first member relative to the second member in response to the upper member being weighted and unweighted by the wearer's foot. In this embodiment, the upper member comprises a first outer cylinder having a flange protruding outwardly from a lower edge thereof and a second inner cylinder, the first outer cylinder and the second inner cylinder being interconnected by an upper surface. The second lower member comprises a first outer cylinder having an outwardly protruding flange extending outwardly from a lower edge portion of the first outer cylinder and a second inner cylinder, the first and second cylinders of the second lower member being interconnected by a bottom surface and interdigitating with the first and second cylinders of the first upper member. The second lower member further comprises a first set of upwardly directed, forwardly slanting teeth opposed by a second offset set of downwardly directed forwardly slanting teeth each secured to an inner wall of the first outer cylinder of said second lower member.

The rotation means for turning said first upper member relative to the second lower member comprises a plurality of pins extending outwardly from said second inner wall of the first upper member which engage the first and second sets of teeth secured to said inner wall of the first outer cylinder of the second lower member, whereby when the upper surface of the first upper member is engaged by a heel portion of the sole of a wearer's foot, the upper member collapses against a force of the spring causing the plurality of pins to engage the upwardly directed forwardly slanting teeth of the second lower member and the plurality of pins to engage the downwardly directed forwardly slanting teeth when the heel portion of the sole of the wearer's foot is lifted from the upper surface of the upper member. The upper surface of the first upper member further comprises a plurality of massaging nodules secured to the upper surface.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
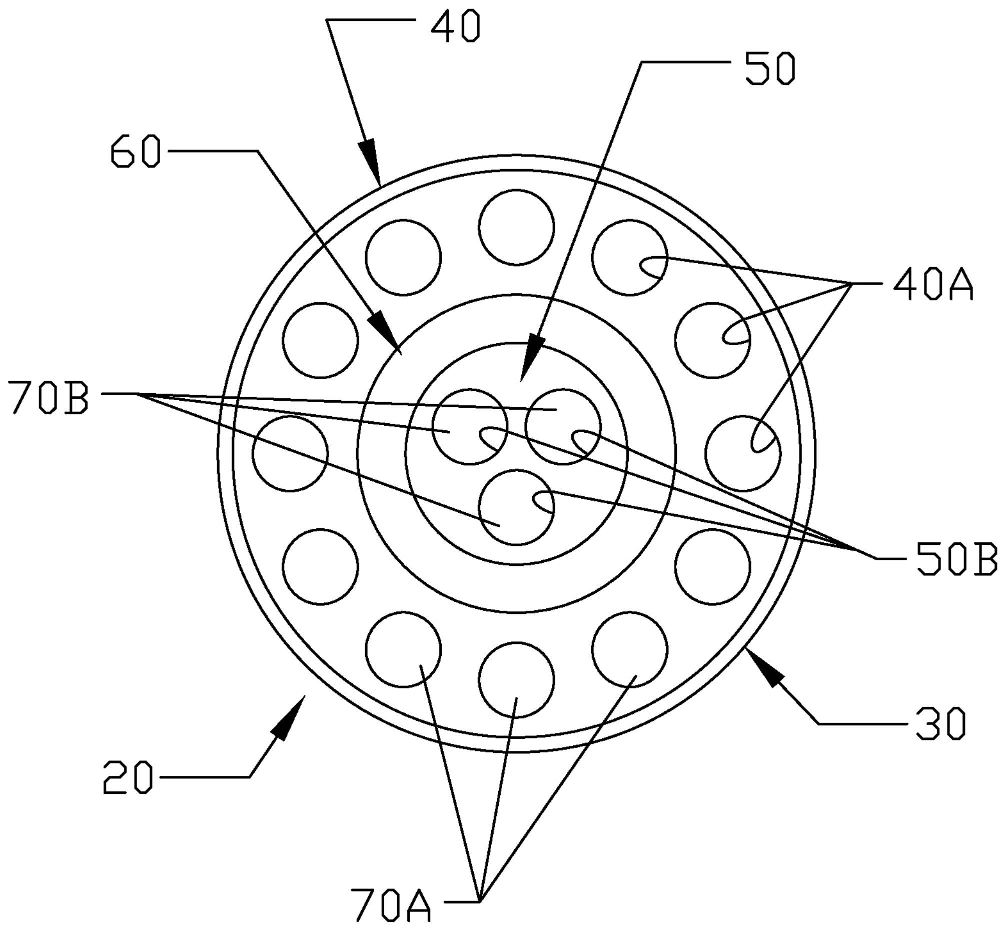
FIG. 1 is a top view of a first embodiment of the dynamic orthotic device of the present invention.
Figure 2:
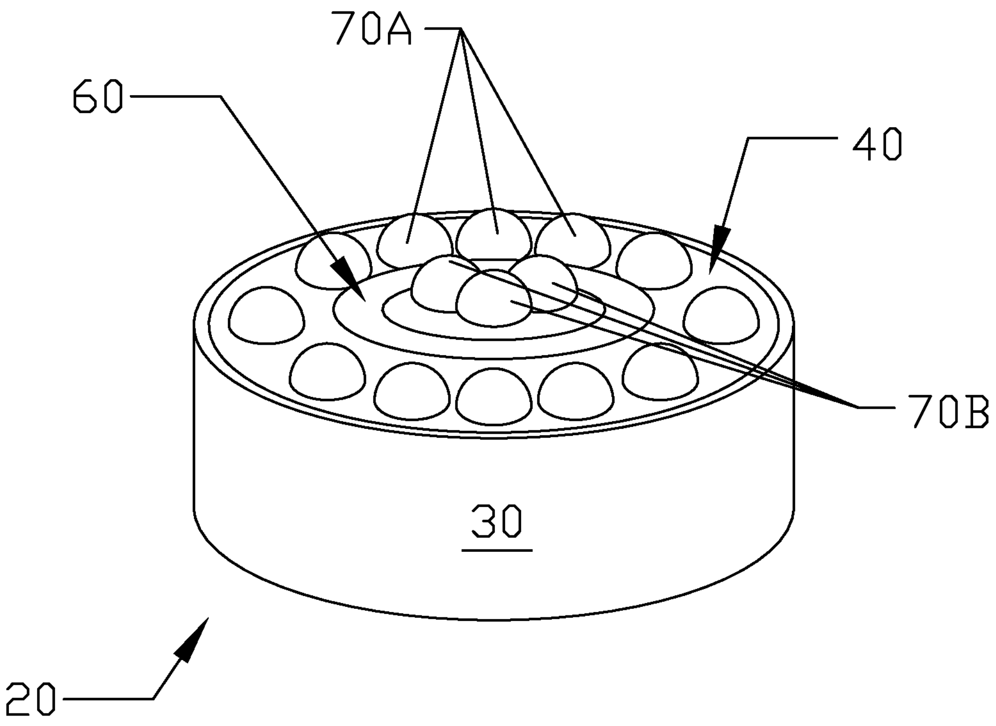
FIG. 2 is a front perspective view of the first embodiment.

A first embodiment of the dynamic orthotic device of the present invention is depicted in FIGS. 1-4 generally at 20. Dynamic orthotic device 20 comprises a base 30, outer rotating disk 40, inner rotating disk 50 pushbutton 60 and a plurality of massaging balls 70. The plurality of massaging balls 70 are grouped in two subsets: 70A and 70B. Each ball of subset 70A is received in one of the holes 40A in outer rotating disk 40 and each of the balls of subset 70B is received in one of the holes 50B in inner rotating disk 50. Although each of the holes 40A and 50B are depicted as being larger than the diameter of its respective ball, it is among the features of the present invention that those holes can be smaller than the diameter of the ball while the distance between the support 54 of base 30 beneath outer rotating disk 40 and the disk 40 itself is larger than ½ the diameter of balls 70B as is the distance between support surface 52 and inner rotating disk 50. Accordingly, balls 70A and 70B, after flexing into the holes via the resilience of the plastic disks 40 and 50, are retained in the dynamic orthotic device 20 rather than spilling out.

Figure 3:
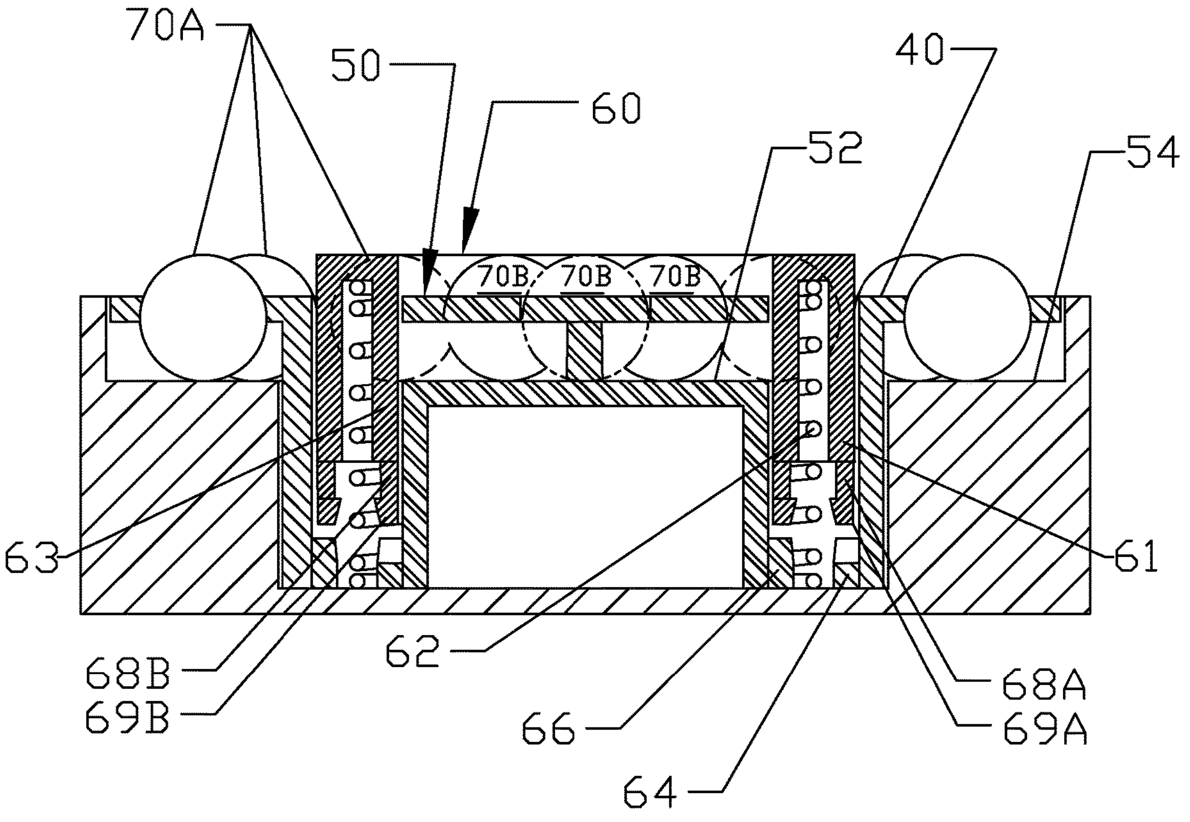
FIG. 3 is a cross-sectional side view of the first embodiment.
Figure 4:
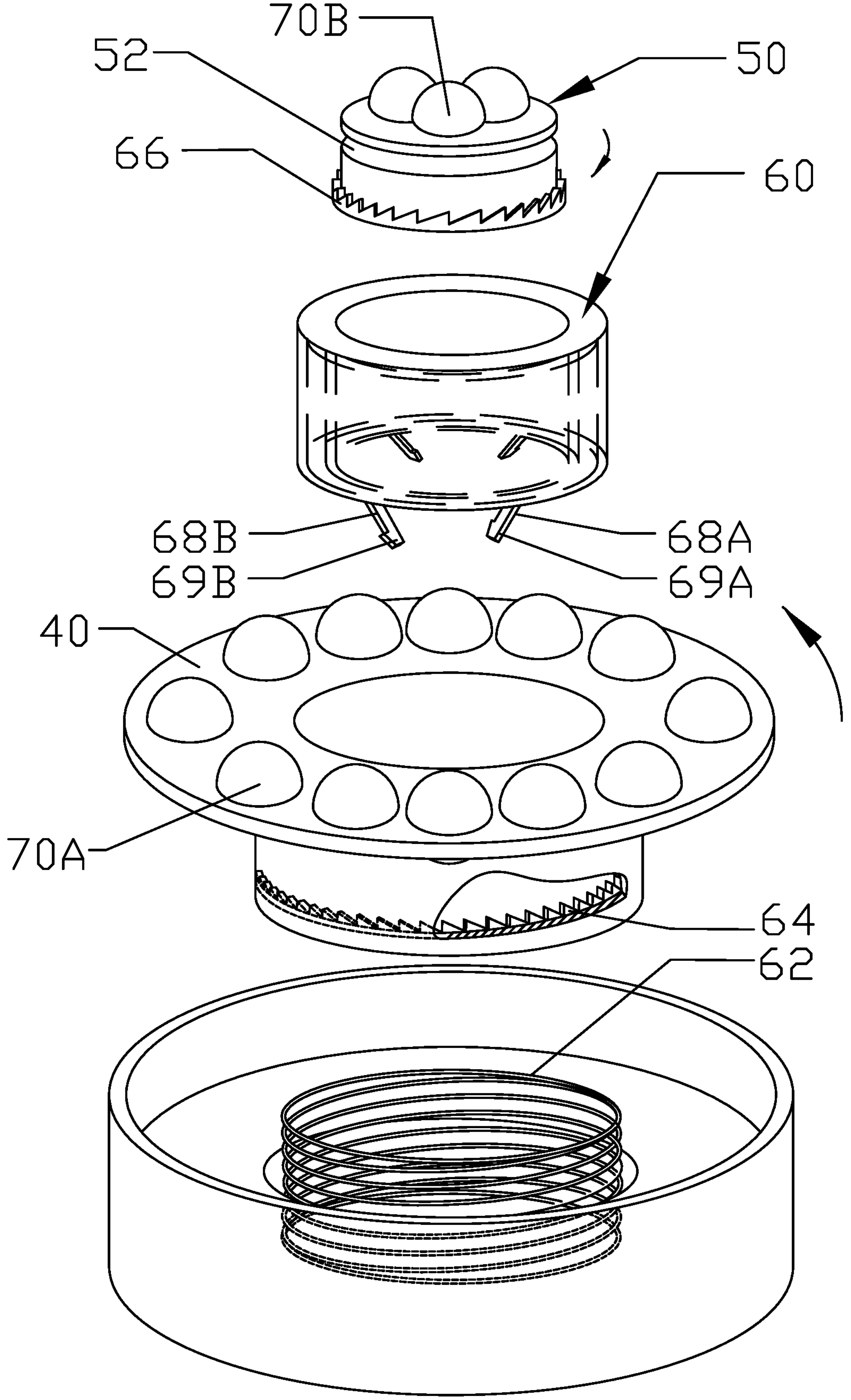
FIG. 4 an exploded front perspective view of the first embodiment.

As best seen in FIGS. 3 and 4, pushbutton 60 has an inverted U shape that accommodates spring 62 which, in turn biases pushbutton 60 upwardly. Outer gear-toothed member 64 is attached to outer rotating disk 40 while inner gear-toothed member 66 is attached to inner rotating disk 50. Two spring-biased arms 68A protrude downwardly from the outer wall 61 of U-shaped pushbutton 60, while two additional spring-biased arms 68B extend downwardly from the inner wall 63 of U-shaped pushbutton 60. It is to be noted the two arms 68A extend in the same direction and the two arms 68B extend in the same (but opposite) direction.

When the dynamic orthotic device 20 is inserted in a shoe, the heel of the wearer will compress pushbutton 60 collapsing spring-biased arms 68A and 68B effectively extending them in opposite directions. The tines 69A and 69B at the ends of arms 68A and 68B will engage gear teeth of members 64 and 66 respectively. As the pressure exerted by the wearer's heel is reduced, spring-biased arms 68A and 68B will return to their at rest positions such that tines 69A and 69B will cause gear-toothed members 64 and 66 to rotate in clockwise and counter-clockwise directions, respectively. Massaging balls 70A and 70B will engage the soles of the wearer's feet in different locations with each step, effectively massaging the soles of the wearer's feet.

Figure 5:
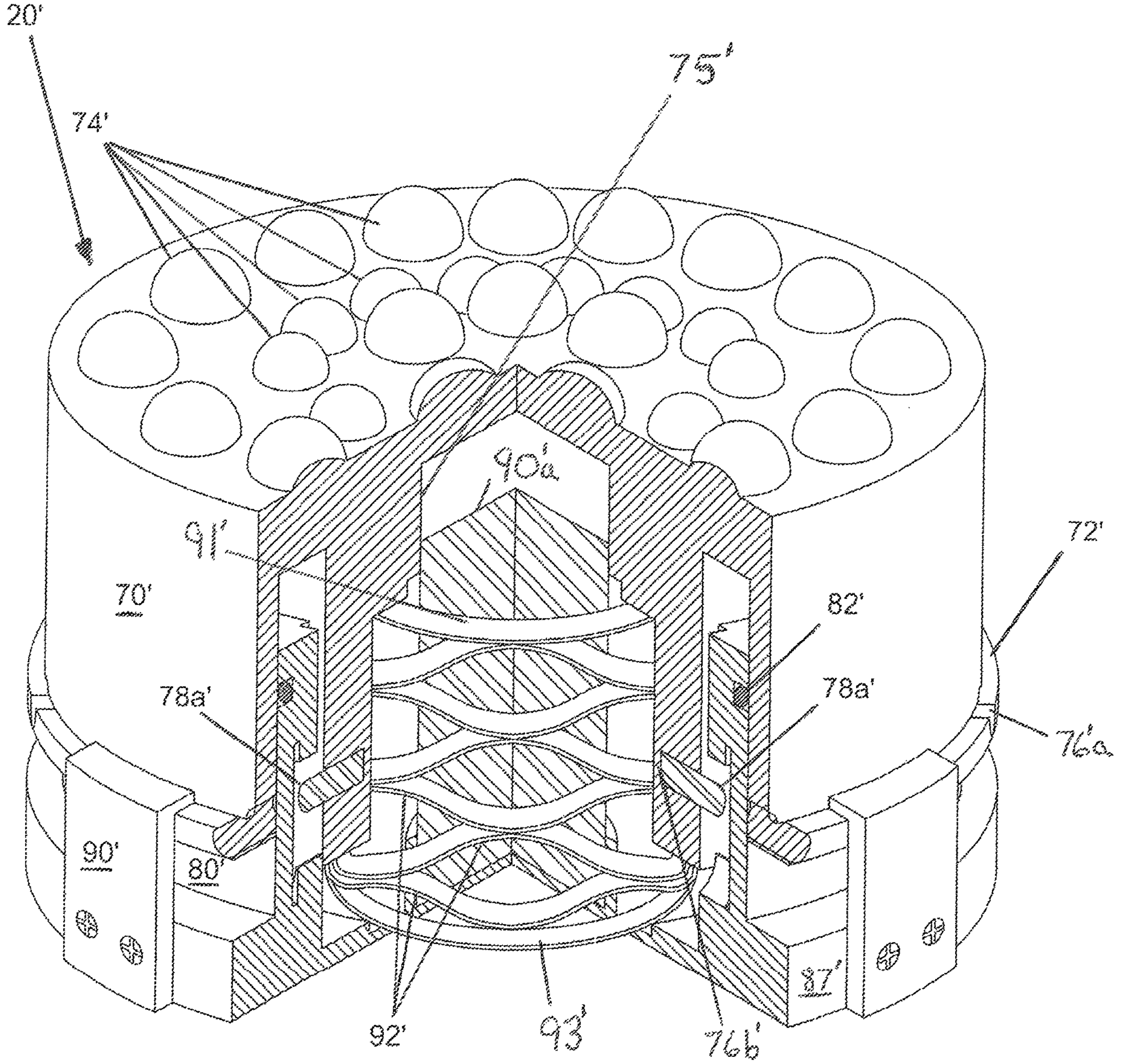
FIG. 5 is a front perspective view of a second embodiment with portions broken away.
Figure 6A:
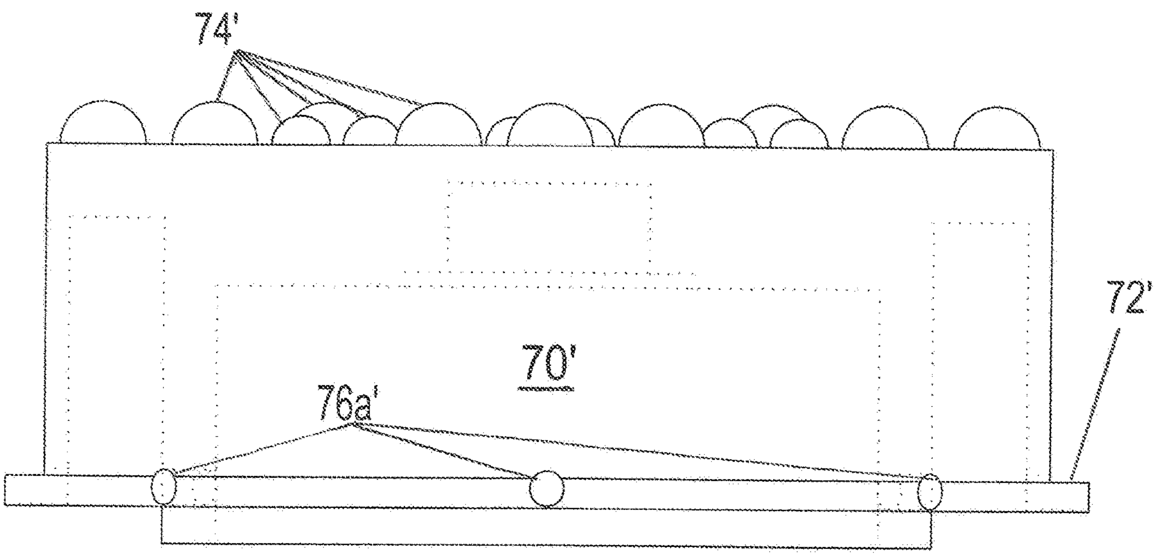
FIG. 6A is a side perspective schematic view of the top member or the second embodiment.
Figure 6C:
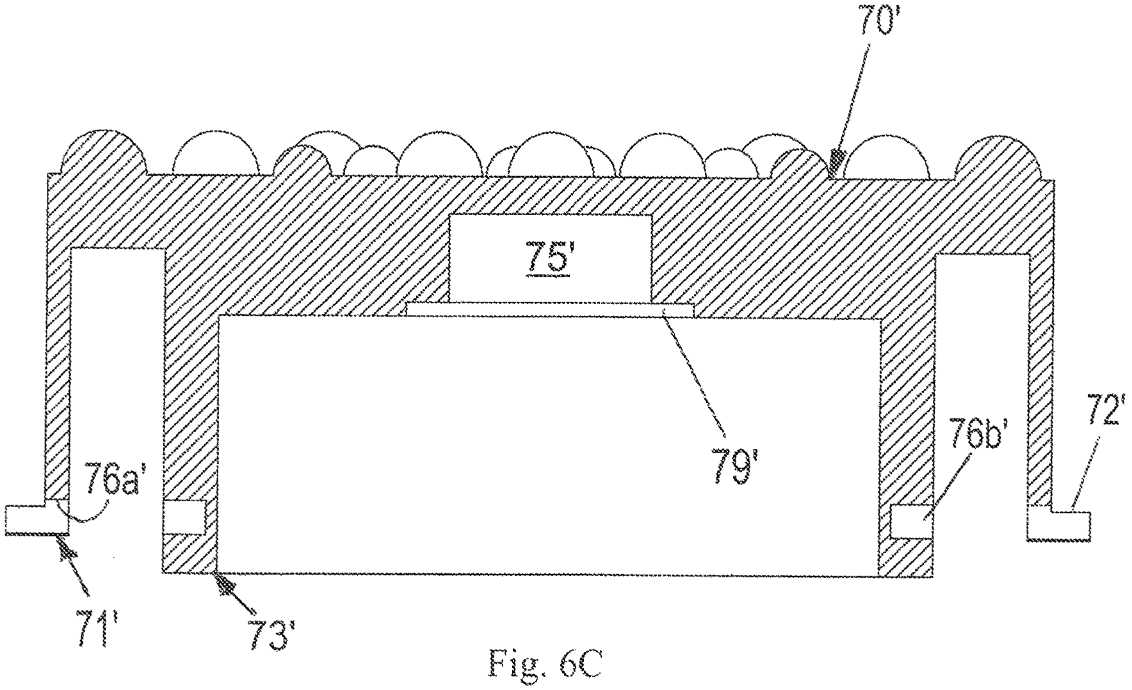
FIG. 6C is a cross-sectional side view of the top member shown in FIG. 6A.
Figure 6B:
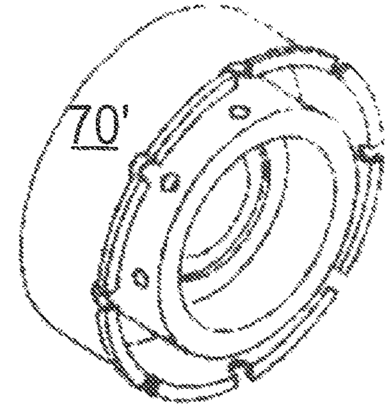
FIG. 6B is a bottom perspective view of the top member shown in FIG. 6A.

Second embodiment, the preferred embodiment, of the dynamic orthotic device of the present invention is shown in FIG. 5 generally at 20'. Device 20' includes first upper element 70' and second lower element 80'. Upper element 70' has massaging nodules 74' on the top surface. Upper element 70' shown in greater detail in FIGS. 6*a*-6*d*, is comprised of a first outer cylinder 71' and a second inner cylinder 73' (FIG. 6C). Outer cylinder 71' has flange 72' protruding from its lower extremity with a series (eight shown) of holes 76' equally spaced about its periphery. Second inner cylinder 73' has a plurality of holes 76*b*' aligned with holes 76*a*'. A plurality of pines 78*a*' are inserted through outer holes 76*a*' and are press fit into holes 76*b*' (FIG. 5). A recess 75' is formed in the central top portion of upper element 70' which provides a sliding engagement with the top of post 90*a*' (FIG. 5, FIG. 7E). Post 90*a*' is press fit into center cylinder 83' (FIG. 7C) of lower element 80'. A stack of spring elements 92' surround post 90*a*' and react between rings 91' and 93' received in recess 79' (FIG. 6C) of upper element 70' and recess 89' (FIG. 7D) of lower element 80', respectively.

Lower element 80' is depicted in greater detail in FIGS. 7A-7D. Cylindrical recess 82*a*' about upper periphery of lower element 80' receives O-ring 82' (FIG. 5) to dampen slightly the movement between upper element 70' and lower element 80'. Peripheral flange 87' has a plurality (three shown) of recesses 84' with two threaded holes each. Similar to upper element 70', lower element 80' has an outer cylinder 81' and a inner cylinder 83'. Around the inside wall of outer cylinder 81', a lower set of teeth 86' and an upper set of teeth 88' are attached, the two sets being offset circumferentially about the outer cylinder 81' for reasons that will be explained shortly. Eight slots 85' are positioned about the periphery of outer cylinder 81' through teeth 88'. Slots 85' do not extend through the outer wall of cylinder 81' (see FIG. 7B).

Figure 6D:
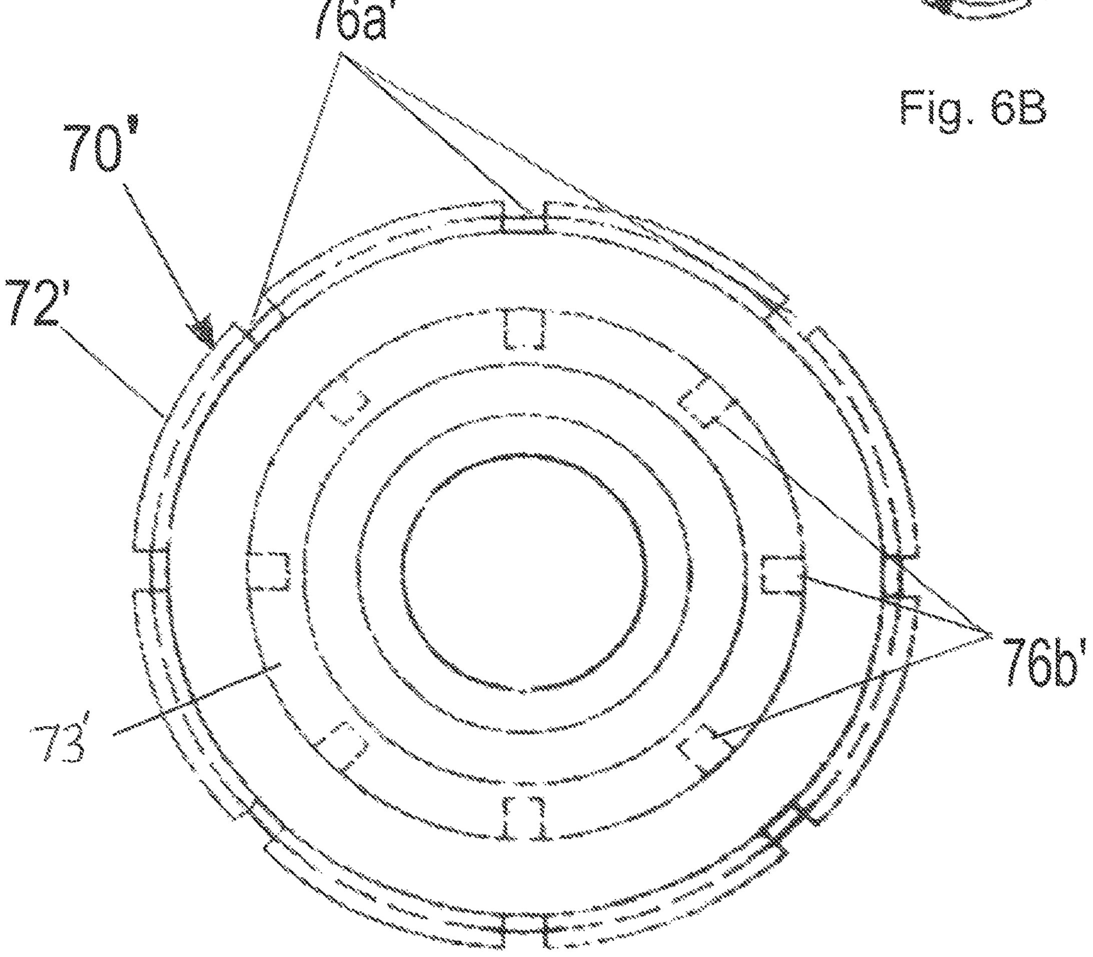
FIG. 6D is a bottom view of the top member shown in FIG. 6A.
Figure 7B:
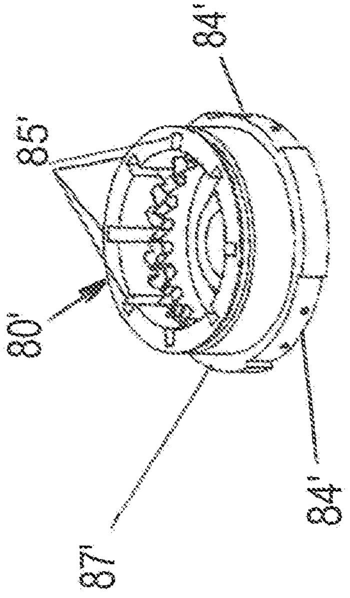
FIG. 7B is a side perspective view of the bottom member shown in FIG. 7A.
Figure 7D:
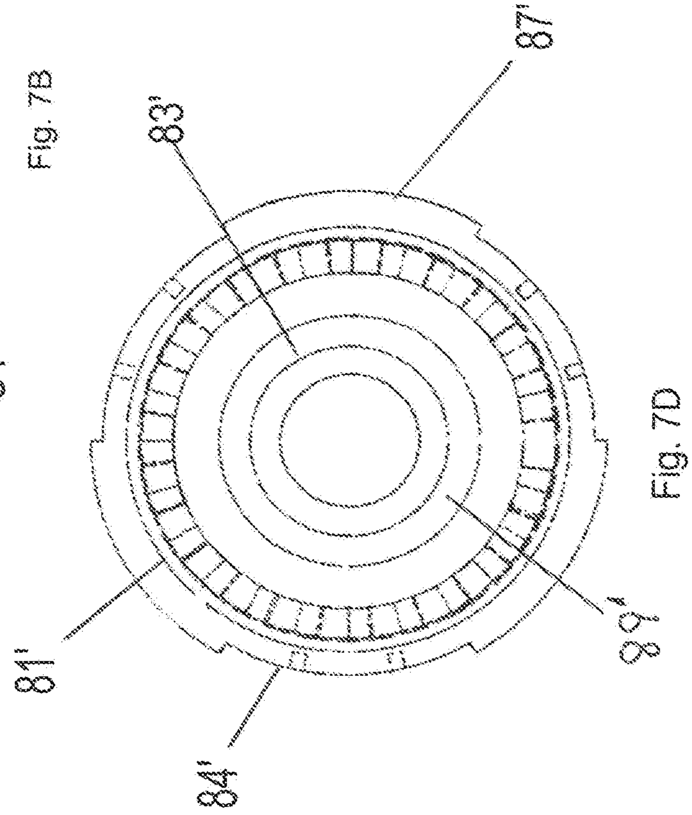
FIG. 7D is a top view of the bottom member shown in FIG. 7A.
Figure 7A:
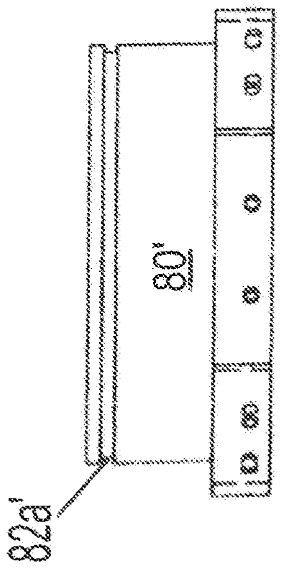
FIG. 7A is a side view of the bottom member of the second embodiment.
Figure 7C:
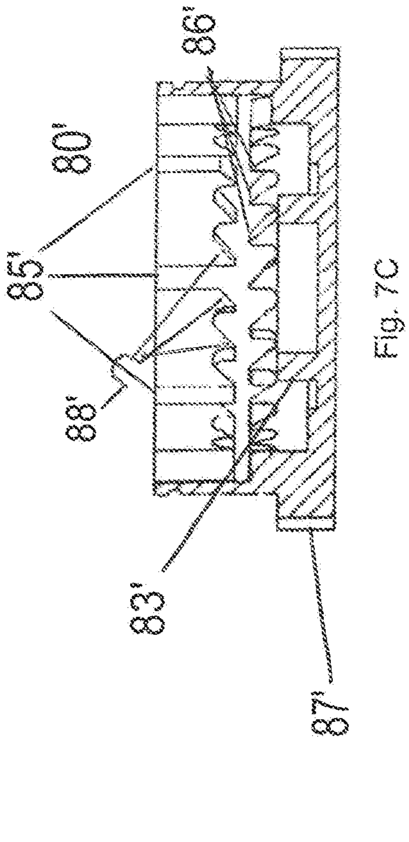
FIG. 7C is a cross-sectional side view of the bottom member shown in FIG. 7A.
Figure 7E:
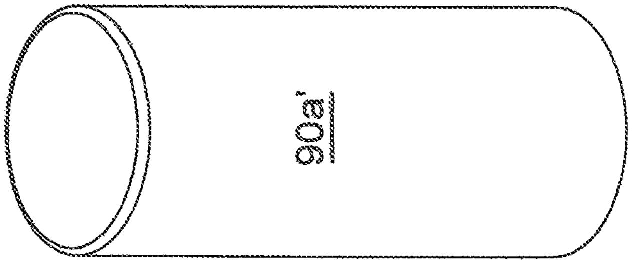
FIG. 7E is a front perspective view of a post associated with the second embodiment.

To assemble the dynamic orthotic device 20' of the second embodiment, the eight pins 78*a*' are inserted through the holes 76*a*' in flange 72' of upper element 70' and press fit into aligned holes 76*b*' around the periphery of inner cylinder 73' (FIG. 6D). After post 90*a*' is press fit into inner cylinder 83' and the stack of springs 'including rings' and 'positioned there over, the pins 78*a*' of upper element 70' are slipped into the slots 85' in lower element 80' (FIG. 7B, 7C) to a position between the two sets of teeth 86' and 88' and rotated slightly and pressure released so that the pins engage teeth 88'. Next, the three locking brackets 90' are secured in recesses 84' in flange 87' by securing the two locking screws into the threaded holes positioned in each recess 84'. The flanges on locking elements 90' engage over flange 72' of upper element 70' and prevent the elements coming apart, while allowing limited relative motion in an axial direction.

In operation, dynamic orthotic device 20' will be placed in the heel of a shoe. As device 20' is stepped upon, upper element 70' collapses against the stack of springs 92'. Pins 78*a*' will engage the forward faces of teeth 86' causing a clockwise rotation of roughly 7.5°. As the walker's foot lifts pressure off of upper element 70', pins 78*a*' initially ride up the vertical face of teeth 86' and then engage the forward-directed faces of teeth 88' causing another rotation of roughly 7.5°. The nodules 74' will massage the bottom of the wearer's foot, repeatedly moving the points of contact, greatly reducing the risk of plantar faciitis and other foot related problems.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A dynamic orthotic device for massaging a heel portion of the sole of a wearer's foot, said dynamic orthotic device comprising:

a) a first upper member comprising a first outer cylinder having a flange protruding outwardly from a lower edge thereof and a second inner cylinder, said first outer cylinder and said second inner cylinder being interconnected by an upper surface;

b) a second lower member supporting the first upper member and including a first outer cylinder having an outwardly protruding flange extending outwardly from a lower edge portion of said first outer cylinder and a second inner cylinder, said first and second cylinders of said second lower member being interconnected by a bottom surface and interdigitating with said first and second cylinders of said first upper member, said second lower member further comprising a first set of upwardly directed, forwardly slanting teeth opposed by a second offset set of downwardly directed forwardly slanting teeth, each secured to an inner wall of said first outer cylinder of said second lower member;

c) spring means to bias said first member away from said second member;

d) rotation means for turning said first member relative to said second member in response to said upper member being weighted and unweighted by the wearer's foot.

2. The dynamic orthotic device of claim 1 wherein said rotation means for turning said first upper member relative to said second lower member comprises a plurality of pins extending outwardly from a second inner wall of said first upper member which engage said first and second sets of forwardly slanting teeth secured to said inner wall of said first outer cylinder of said second lower member, whereby when said upper surface of said first upper member is engaged by a heel portion of the sole of a wearer's foot, said upper member collapses against a force of said spring means causing said plurality of pins to engage said upwardly directed forwardly slanting teeth of said second lower member and said plurality of pins to engage said downwardly directed forwardly slanting teeth when the heel portion of the sole of the wearer's foot is lifted from said upper surface of said upper member.

3. The dynamic orthotic device of claim 1 wherein said upper surface of said first upper member further comprises a plurality of massaging nodules secured to said upper surface.

4. The dynamic orthotic device of claim 1 further comprising a cylindrical post press fit into and extending upwardly from said inner second cylinder of said second lower member and wherein said spring means comprises a stack of spring elements surrounding said post.

5. A dynamic orthotic device for massaging a heel portion of the sole of a wearer's foot, said dynamic orthotic device comprising:

a) a first upper member comprising a first outer cylinder having a flange protruding outwardly from a lower edge thereof and a second inner cylinder, said first outer cylinder and said second inner cylinder being interconnected by an upper surface, said upper surface of said upper member having a plurality of massaging nodules thereon;

b) a second lower member supporting the first upper member and comprising a cylinder having an outwardly protruding flange extending outwardly from a lower edge portion of said cylinder, said cylinder interdigitating with said first and second cylinders of said first upper member, said second lower member further comprising a first set of upwardly directed, forwardly slanting teeth opposed by a second offset set of downwardly directed forwardly slanting teeth, each secured to an inner wall of said cylinder of said second lower member;

c) spring means to bias said first member away from said second member;

d) rotation means for turning said first member relative to said second member in response to said upper member being weighted and unweighted by the wearer's foot.

6. The dynamic orthotic device of claim 5 wherein said rotation means for turning said first upper member relative to said second lower member comprises a plurality of pins extending outwardly from a second inner wall of said first upper member which engage said first and second sets of forwardly slanting teeth secured to said inner wall of said cylinder of said second lower member, whereby when said upper surface of said first upper member is engaged by a heel portion of the sole of a wearer's foot, said upper member collapses against a force of said spring means causing said plurality of pins to engage said upwardly directed forwardly slanting teeth of said second lower member and said plurality of pins to engage said downwardly directed forwardly slanting teeth when the heel portion of the sole of the wearer's foot is lifted from said upper surface of said upper member.

* * * * *